United States Patent [19]

Ogasawara

[11] Patent Number: 5,768,639
[45] Date of Patent: Jun. 16, 1998

[54] DIAPHRAGM CONTROLLING DEVICE FOR A CAMERA

[75] Inventor: Akira Ogasawara, Kanagawa-ken, Japan

[73] Assignee: Nikon Corporation, Tokyo, Japan

[21] Appl. No.: 797,282

[22] Filed: Feb. 7, 1997

Related U.S. Application Data

[63] Continuation of Ser. No. 378,456, Jan. 25, 1995, abandoned.

[30] Foreign Application Priority Data

Apr. 22, 1994 [JP] Japan .................................. 6-107685

[51] Int. Cl.$^6$ ..................................................... G03B 7/08
[52] U.S. Cl. ........................... 396/261; 396/508; 396/258
[58] Field of Search ............................... 396/257, 258, 396/261, 505, 508

[56] References Cited

U.S. PATENT DOCUMENTS

| | | | |
|---|---|---|---|
| 4,381,889 | 5/1983 | Sahara et al. | 354/41 |
| 4,396,271 | 8/1983 | Hiraike | 354/271 |
| 4,429,973 | 2/1984 | Kawasaki et al. | 396/257 |
| 4,514,075 | 4/1985 | Negishi et al. | 354/446 |
| 4,874,233 | 10/1989 | Yamamoto et al. | 354/446 |
| 4,989,030 | 1/1991 | Naka et al. | 354/271.1 |
| 5,196,940 | 3/1993 | Sato | 354/271.1 |
| 5,325,149 | 6/1994 | Kawahara | 354/446 |
| 5,430,519 | 7/1995 | Shimada et al. | 354/271.1 |

FOREIGN PATENT DOCUMENTS

| | | |
|---|---|---|
| A-53-9526 | 1/1978 | Japan . |
| A-53-129034 | 11/1978 | Japan . |

*Primary Examiner*—David M. Gray
*Assistant Examiner*—Michael Dalakis
*Attorney, Agent, or Firm*—Oliff & Berridge, PLC

[57] ABSTRACT

A diaphragm control device for a camera comprises a diaphragm driving mechanism that drives the diaphragm, a diaphragm position detection device which calculates the opening diameter of the diaphragm from the standard opening diameter and transmits the opening diameter as a pulse, a diaphragm connection mechanism that fixes the opening diameter of the diaphragm, a recording device that records information concerning a change in the generation cycle, which has been measured in advance, and a control that controls the driving of the diaphragm driving mechanism and of the diaphragm connection mechanism, based on the output of the diaphragm position detection device. The control determines the change in the generation cycle from the total number of pulses generated up until the generation of the current pulse by referring to information in the recording device, and determines the time that indicates the connecting action in the diaphragm connection mechanism.

5 Claims, 5 Drawing Sheets

DIAPHRAGM CONTROLLING DEVICE FOR A CAMERA

This is a Continuation of application Ser. No. 08/378,456, filed Jan. 25, 1995, now abandoned.

BACKGROUND OF THE INVENTION

1. Field of the Invention

The present invention relates to a diaphragm controlling device for a camera which is designed for use in a single lens reflex camera.

2. Description of Related Art

With conventional diaphragm controlling devices used in single lens reflex cameras, when the diaphragm begins to close in after being released, the change in the diaphragm opening diameter is monitored by a pulse generated by an encoder. A diaphragm closure stopping signal is transmitted to the diaphragm so that the diaphragm opening will stop at a fixed radius when the diaphragm receives the transmission.

As with most electromechanical transmissions, there is a time delay between the time that the diaphragm is directed to stop and the time that the diaphragm actually receives the transmission and stops. The diaphragm closure amount that occurs during the delay time can be predicted from the amount that the diaphragm opening diameter changes.

However, a problem exists in predicting the diaphragm closure amount that occurs during the delay time from the amount that the diaphragm opening diameter changes if the diaphragm pulse generating time cannot be accurately determined. If the diaphragm pulse generating time cannot be accurately determined, the detection becomes inaccurate, a large error results in the predicted diaphragm closure amount, and the accuracy of the control of the diaphragm closure is diminished. To avoid a problem of this nature, the diaphragm pulse is generally detected in real time and is input as an interruption to a CPU.

However, the CPU may be carrying out many tasks in parallel and in addition to controlling the diaphragm and the interruption procedures related to the controlling of the diaphragm. These other tasks may temporally overlap with the diaphragm control and interruption procedures. The receipt of the diaphragm pulse interruption by the CPU may be delayed and this delay is difficult to accurately detect.

A CPU may be provided which communicates through hardware to a built-in timer value stored in the CPU. This built-in timer value corresponds to the generation of the interruption signal. These CPUs also have an 'input capture' function. If the diaphragm pulse is changed to a capture or stop signal using a CPU with the built-in timer value, there should be no problems since the time will be accurate, even if the receipt of the diaphragm pulse interruption is delayed. However, in cases in which this type of CPU cannot be used because of cost, or where a capture function is provided in the CPU and the function is not compatible with the system, or in cases where the capture function must be given up for another signal, the problem remains that the generation time of the diaphragm pulse cannot be accurately determined.

SUMMARY OF THE INVENTION

The present invention has been developed in light of these problems. The diaphragm control device of this invention includes calculating a pulse cycle for stopping the diaphragm with a high degree of accuracy, even if diaphragm pulse detection is delayed. Thus, the diaphragm control device makes possible highly accurate diaphragm control.

In order to accomplish these objectives, the diaphragm control device for a camera utilizing the present invention includes a diaphragm driving means for driving the diaphragm; a diaphragm position detection means which calculates the opening diameter of the diaphragm from a standard opening diameter; means for transmitting the opening diameter as a pulse; a diaphragm connection means that stops the opening diameter of the diaphragm; a recording means that records and stores changes in the generation cycle of the pulses necessary to accurately stop the diaphragm, where the changes have been measured in advance; and a control means that controls the driving of the diaphragm driving means and the diaphragm connection means, based upon the output of the diaphragm position detection means. The control means determines the change in the generated cycle needed to accurately stop the diaphragm from the total number of pulses generated up until the generation of the current pulse, by referring to a previously determined and recorded change set in the recording means. The control means also determines the time delay for the connecting action of the diaphragm connection means.

DETAILED DESCRIPTION OF PREFERRED EMBODIMENTS

The diaphragm control device for a camera made according to the present invention enables highly accurate diaphragm control to be carried out, even if there is a delay in the detection of the diaphragm pulse. This accuracy is due to the control means determining the change in the generation cycle of the pulses necessary to accurately stop the diaphragm by referring to the previously measured change set in the recording means. The control means determines the time indicating the connecting action in the diaphragm connection means. Thus, the pulse cycle necessary for accurately stopping the diaphragm can be calculated with a high degree of accuracy.

Figure 4:
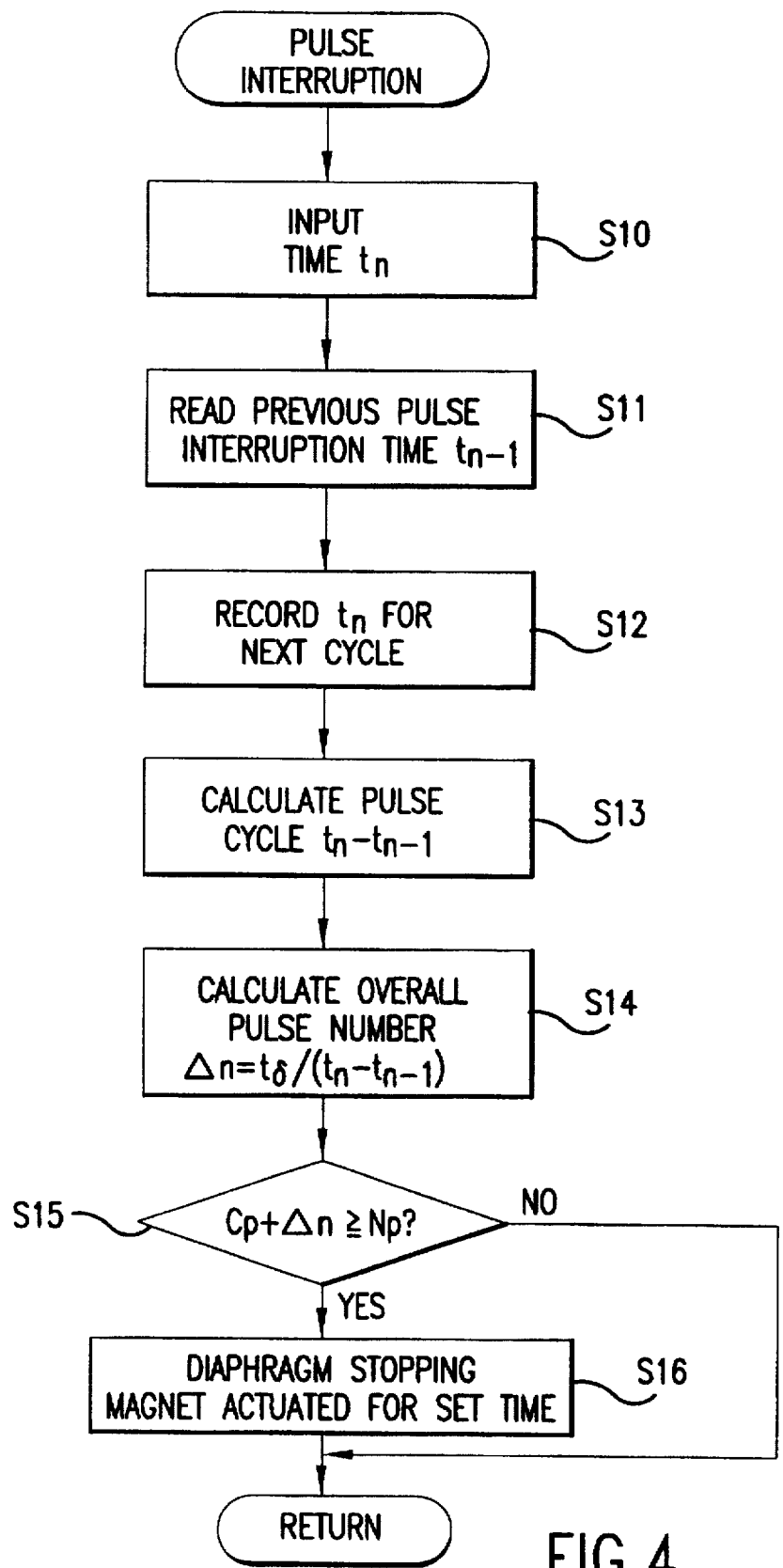
FIG. 4 is a flow chart showing a conventional diaphragm control device for a camera.

An embodiment of the present invention is described hereafter, with reference to the drawings. In order to provide a comparative description, a flow chart describing a conventional diaphragm control device for a camera is shown in FIG. 4.

Figure 1:
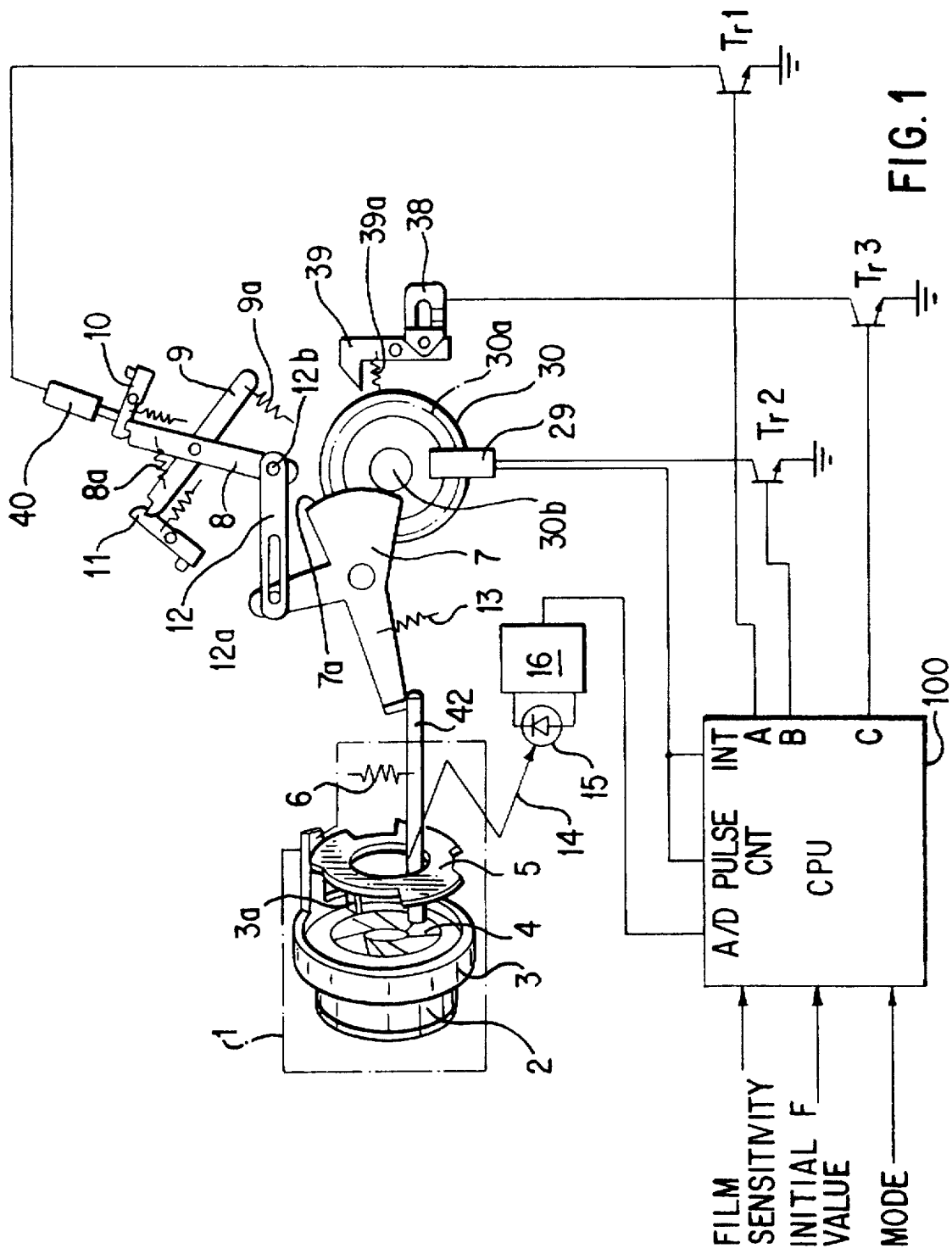
FIG. 1 is a schematic drawing showing an embodiment of a diaphragm control device for a camera according to the present invention.

In FIG. 1, an interchangeable lens 1 comprises an optical lens 2, a diaphragm preset ring 3, a diaphragm mechanism 4, and a bayonet coupling structure 5 used for installation of the lens 1 onto the camera body (not shown). Element 4a is a diaphragm interlocking component that operates the diaphragm mechanism 4. Diaphragm interlocking component 4a is biased by spring 6. Diaphragm mechanism 4 closes when the diaphragm interlocking component 4a is moved in the upwards direction in FIG. 1 by the biasing of spring 6. Stopper 3a establishes the position of diaphragm mechanism 4 according to the rotary position of the diaphragm preset ring 3. The diaphragm mechanism 4 can close until the interlocking component 4a contacts the stopper 3a.

In the device of FIG. 1, a diaphragm automatic control mode, a shutter automatic control mode, a program mode, or a manual mode can be selected and transmitted to the CPU 100 through a mode selecting means (not shown). The CPU 100 controls the diaphragm mechanism 4 and the shutter (not shown) according to the selected photographic mode. In the diaphragm automatic control mode and in the program mode, the diaphragm position and the diaphragm mechanism 4 is electromechanically started and stopped by the CPU 100. The diaphragm position is determined by the preset ring 3 in the shutter automatic control mode and in the manual mode. Of the various modes, the present invention is utilized in the diaphragm automatic control mode or in the program mode.

Initially, a mechanism records the relationship between the initial diaphragm closure of the interchangeable lens 1 and the displacement of the diaphragm interlocking component 4a. Element 7 represents a camera body-side diaphragm operating component. When the interchangeable lens 1 is installed onto the camera body, the component 7 connects with the diaphragm interlocking component 4a on the interchangeable lens 1. The diaphragm interlocking component 4a encounters a counterclockwise biasing force by spring 6. Camera sidebody diaphragm operating component 7 is forced downwardly in FIG. 1 by spring 13, which is stronger than spring 6. Thus, the springs act through components 4a and 7 to force the diaphragm mechanism 4 to the open state.

Elements 8–11 represent a commonly known diaphragm closure driving means, which interlocks with the film winding mechanism (not shown) and are in the charged state in FIG. 1. An interlocking component 12 links the diaphragm operating component 7 and a first lever 8 by means of a slot 12a and a pin 12b. When the diaphragm control mode of the camera has been selected by the user, the diaphragm preset ring 3 is set to the value corresponding to the smallest diaphragm radius.

Light rays 14 pass through the diaphragm mechanism 4 and are received by a light receiving element 15. Light receiving element 15 is positioned in the vicinity of a pentagonal prism or the like (not shown), and generates signals indicative of the amount of light that has passed through the lens. These signals are transmitted to the CPU 100 after being logarithmically compressed by a light measuring circuit 16. The CPU 100 transforms the logarithmically compressed measured light amount to a digital value through a built-in A/D transforming mechanism (not shown). In the CPU 100, data is supplied for film sensitivity, the photographic mode, the initial F value, and the like. The CPU 100 calculates the diaphragm target diameter and shutter time to take a picture considering the data for film sensitivity, the photographic mode, the initial F value, and the like.

When the release button (not shown) is depressed, the CPU 100 detects the data fed to it and controls the release according to calculated values of the diaphragm target diameter and shutter time. In the following description, all directions are in reference to FIG. 1. First, the CPU maintains its port A at LOW for a fixed time interval, causing transistor Tr1 to be activated. Transistor Tr1 magnetizes a release magnet 40 for the fixed time interval. Release magnet 40 generates an attraction force and the first stopping component or latch 10 is drawn to magnet 40. Latch 10 is released from its latched position with the first lever. The first lever 8 is then rotationally urged in the counterclockwise direction by a spring 8a. As a result of the counterclockwise rotation of first lever 8, the interlocking component 12 is pulled to the right. When the interlocking component 12 is moved to the right, a force is applied to diaphragm operating component 7 through the interaction of slot 12a and the pin (not labelled) on the arm of diaphragm operating component 7.

The diaphragm operating component 7 encounters the resistance of the spring 13 but due to the force applied from the interlocking component 12, the diaphragm operating component 7 rotates in the clockwise direction. The diaphragm mechanism 4 gradually closes according to the clockwise rotation of the operating component 7.

Diaphragm operating component 7 includes a fan-shaped component 7a formed at the end of the operating component 7. Fan-shaped component 7a is formed with teeth at its wide end. These teeth (not labeled) cooperate with a gear wheel 30b of wheel 30. Wheel 30 also includes disk 30a which is used for encoding rotation of the operating component 7 (described hereinafter). During the rotation of the diaphragm operation component, the fan-shaped component also rotates the gear wheel 30b. Gear wheel 30b is connected to disk 30a, so rotation of diaphragm operating component causes disk 30a to rotate.

When, the CPU causes port B to be maintained at LOW similarly to port A, Tr2 turns on at the same time that the diaphragm starts to close. Port B is electrically connected to a photo interrupter 29, which is an encoder used to monitor the diaphragm closure. A slit (not labeled) on the edge of the disk 30a passes the photo interrupter 29, which causes the rotational amount of the diaphragm operating component 7 to be detected as a pulse or diaphragm pulse. The diaphragm pulse is proportionate to the amount of rotation of the disk 30a. Due to the cooperating interconnection, the closure amount of the diaphragm mechanism 4 can also be detected.

The diaphragm pulse is fed through transistor Tr2 to an interruption input terminal (int) and counter input (pulse cnt) of the CPU 100. When the pulse number, which corresponds to the amount of diaphragm closure amount necessary to coincide with the diaphragm target diameter calculated in advance, is detected from the diaphragm pulse, the CPU 100 acts as follows. The CPU 100 turns port C to LOW, which turns on transistor Tr3 for a fixed time interval. This activates diaphragm stopping magnet 38. The diaphragm stopping magnet 38 is deenergized and loses the attraction force between it and the stop latch 39. The stop latch 39 then rotates in the counterclockwise direction due to spring 39a. Stop latch 39 then engages teeth provided at the edge of the disk 30a and the rotation of the disk 30a is stopped. Thus, by the interconnection of gear wheel 30b, fan-shaped component 7a of diaphragm operating component 7 and the diaphragm interlocking component 4a, the movement of the diaphragm mechanism 4 is stopped. However, the activation of the diaphragm stopping magnet 38 and the stopping of the diaphragm mechanism are not simultaneous. Thus, it is necessary to consider the diaphragm closure amount that occurs during the delay time $t_d$.

Figure 2:
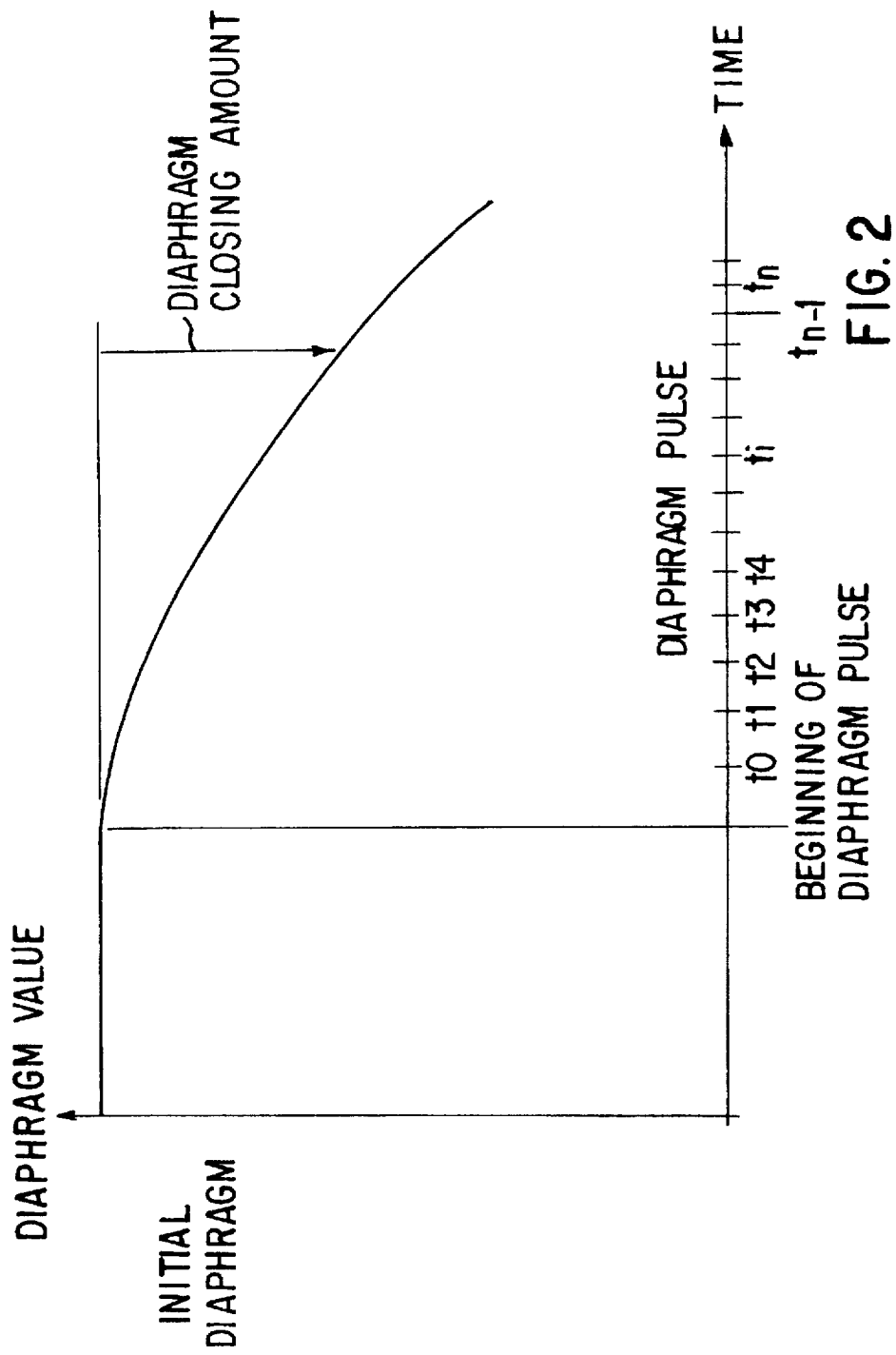
FIG. 2 is a graphical representation showing the diaphragm value versus time for a diaphragm control device according to the present invention.

FIG. 2 shows the diaphragm pulse after the commencement of the diaphragm closing action, plotted against time on the horizontal axis, the vertical axis representing the diaphragm value. The diaphragm is closed from the initial F value by an amount that is almost proportional to the number of diaphragm pulses generated. As shown in FIG. 2, the diaphragm pulse generation cycle shortens with time because the closing of the diaphragm mechanism 4 is accelerated. The acceleration of the closing of the diaphragm mechanism is caused by the unbalanced state of the spring forces of spring 6, spring 13, and spring 8a. The acceleration is also caused by the rotation of the components such as the diaphragm operating component 7. It is not preferable that the closing speed of the diaphragm accelerate. However, once the diaphragm stopping magnet 38 has been turned on, there is no problem with a small amount of acceleration during the delay time until the diaphragm stops. This is because the actual delay time ($t_d$) is approximately 2 ms.

Conventionally, the diaphragm closing speed has been assumed to be virtually constant, i.e., the time used to calculate the diaphragm closing speed was detected for each generated diaphragm pulse. Detection of the time may be accomplished based on the difference from the time when the previously generated diaphragm pulse was calculated. A pulse number $\Delta n$, referred to hereafter as the overrun pulse number is generated during the delay time $t_d$, that occurs when the stopping magnet 38 is activated. The pulse number is calculated from the pulse cycle, or from the approximate diaphragm closing velocity vp and the delay time $t_d$.

Cp represents an integral value of the diaphragm pulses which occur after the diaphragm starts to close. When the sum of the overrun pulse number $\Delta n$ and the integral value Cp equals the number of pulses corresponding to the target diameter diaphragm closure amount, the stopping magnet 38 is activated. If the diaphragm pulse Pi is generated at the time $t_i$, the diaphragm closing velocity $V_p$ calculated at time $t_n$ is given by the following equation:

$$V_p = 1/(t_n - t_{n-1}) \quad (1)$$

The overrun pulse number $\Delta n$ activated at the time $t_n$, is given by the following equation:

$$\Delta n = t_d \times V_p = t_d/(t_n - t_{n-1}) \quad (2)$$

A diaphragm closure $\Delta Av$ amount equals the difference between the target diaphragm controlling value and the initial diaphragm value. The amount the diaphragm changes for one pulse is represented by $\delta Av$. The pulse number Np, required to stop the diaphragm at the target value, is calculated:

$$Np = \Delta Av/\delta Av.$$

When a pulse is generated for each cycle, the running total pulse number is Cp.
When the state $$Cp + \Delta n = Cp + (t_d/(t_n - t_{n-1})) \geq Np \quad (3)$$

is met, the stopping magnet 38 is activated. In order to compensate for variations in the individual delay times $t_d$ and for the above-noted accelerations in the diaphragm closing speeds, there are many cases in which the delay time $t_d$ is a time period that can be predetermined and precalculated. The delay time $t_d$ data can be adjusted during assembly of the camera so that the controlled result will match the target value.

Figure 3:
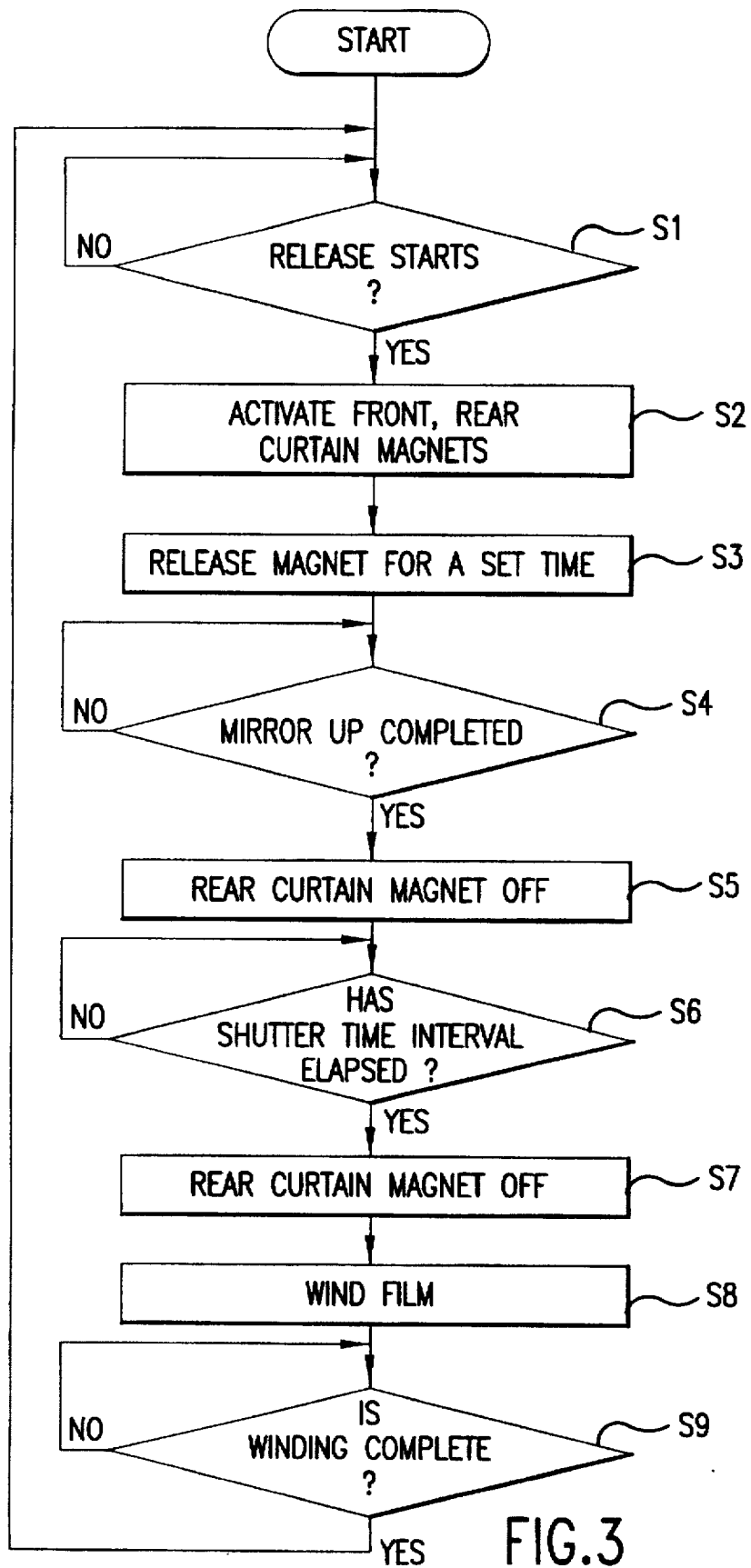
FIG. 3 is a flow chart showing the operation of a camera with the diaphragm control device according to the present invention.

FIGS. 3 and 4 are flow charts that describe the action of the CPU 100. FIG. 3 is a flow chart of the main control that relates to the diaphragm control mechanism of FIG. 1. FIG. 4 is a flow chart that describes a conventional diaphragm control device for a camera and which shows the interruption procedure that occurs with the generation of each diaphragm pulse.

FIG. 3 shows the control of not only the diaphragm control but of the entire photographic sequence. The shutter control utilizes an electromagnetic release. At the beginning of the release sequence, the front and rear curtains (not shown) are stopped by their respective control magnets (not shown). When mirror up is finished, the rear curtain control magnet is deactivated and the rear curtain is released. Before the release sequence is completed, the front and rear curtains are mechanically charged to their initial positions by a holding mechanism (not shown), so that the curtains are held in the stopped state even if the magnets are deactivated. In order for the mechanical stopping mechanism of this holding mechanism to disengage the curtains upon the activation of the release magnet 40 of FIG. 1, it is necessary to activate each stopping magnet.

When the program starts in FIG. 3, step S1 awaits the beginning of the release. When the beginning of the release sequence occurs, the stopping magnets 38 are activated in step S2, in order to stop the front and rear curtains. In step S3, the release magnet 40 is activated for several ms, moving the diaphragm mechanism 4 and starting the mirror up of the main mirror (not shown). A diaphragm closing control procedure is then conducted at this point. The diaphragm pulse from interrupter 29 is supplied to the CPU 100 interruption input terminal (int). Each time this pulse is generated the CPU 100 moves to the interruption procedure. The diaphragm pulse is also supplied to the counter input terminal (pulse cnt) in the CPU 100. The cumulative diaphragm pulse number Cp is counted from the start of the diaphragm's closing.

After step S3, step S4 simply waits for the delay time to elapse, this delay time being the fixed time that compensates for the completion of mirror up. The interruption procedure for the generation of a diaphragm pulse is carried out conventionally by the interruption control shown in the flow chart of FIG. 4.

The process of FIG. 4 is started by the generation of a diaphragm pulse, the input time $t_n$ being read in step S10. The CPU 100 is provided having a timer with a built-in clock function and a recording buffer for recording and storing pulse generation times $t_n$. In step S11, the previous diaphragm pulse generation time $t_{n-1}$ is read from the recording buffer. In step S12, the time $t_n$ read in step S10 and is stored in the recording buffer for the next interruption procedure. In step S13, the pulse cycle $t_n - t_{n-1}$ is calculated. In step S14, the predicted overrun pulse number $\Delta n$ is calculated according to equation (2). In step S15, by using equation (3) it is determined whether or not the diaphragm movement should be stopped. If equation (3) is satisfied, the diaphragm stopping magnet 38 is activated for a fixed interval in step S16, the diaphragm movement stops and the program returns to step S4 of FIG. 3. Each time a diaphragm pulse is generated, the flow of FIG. 4 is interrupted. The diaphragm control and stopping are completed before mirror up.

When mirror up is completed in step S4 of FIG. 3, the front step magnet is turned off in step S5 and the front curtain moves. In step S6, the process waits for the shutter time interval to elapse. When the shutter time interval has elapsed, the rear curtain magnet is turned off in step S7 so the rear curtain moves. The shutter control is then completed. In step S8, the film is wound. During the winding the diaphragm is returned to its original state, mirror down is carried out, and the shutter curtains are also charged to their original state. At step S9, after the winding of film in step S8, the program determines whether the winding is complete, and repeats the winding as necessary.

Describing movement of the device with reference to FIG. 1, the second latch 11 is released by a conventional mechanism (not shown) during the winding of the film. The second lever 9 is biased in the clockwise direction by spring 9a. The first lever 8 is pushed by a contactor 9b when rotation of lever 9 moves in the clockwise direction resulting in rotation of lever 8 in the clockwise direction. The interlocking component 12 is then pushed to the left. This results in the diaphragm operating component 7, being pulled by the force of spring 13, rotating in the counter-clockwise direction.

The movement of diaphragm operating component 7 in the counter-clockwise direction results in the movement of the interlocking component 4a. Thus, the diaphragm mechanism is returned to the initial state. Mirror up is carried out in conjunction with the diaphragm return action and the film is then wound by a motor winding device (not shown). The second lever 9 is rotated in the counter-clockwise direction by a commonly known mechanism (not shown) in conjunction with the winding of the film. Since the first lever 8 has been latched with the stopping component or latch 10 at the end of the diaphragm return action, the diaphragm closing driving means 8–11 is again set in the charged position prepared for the next photograph.

Figures 5, 6:
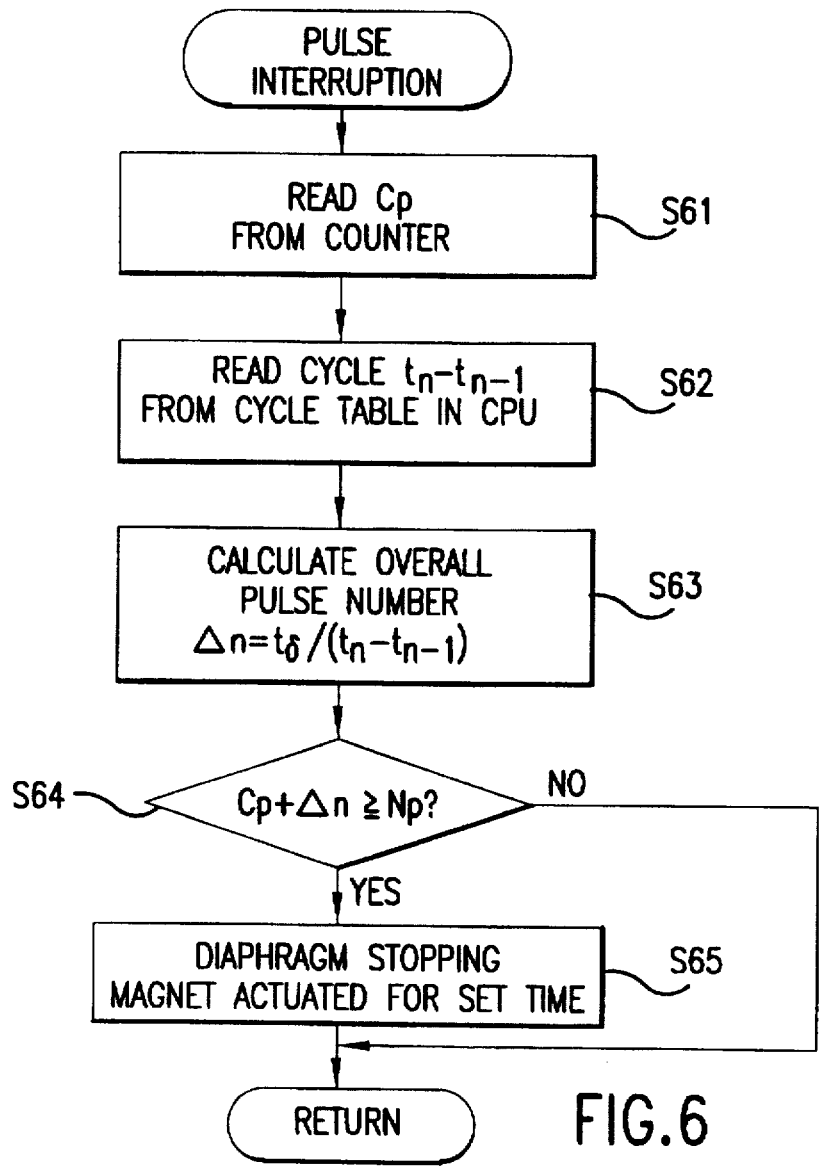
FIG. 5 is a table showing examples of measured pulse cycles for a diaphragm control device in a camera according to the present invention.
FIG. 6 is a flowchart showing the pulse interruption for a diaphragm control device according to the present invention.

An embodiment of the present invention is described hereafter with reference to FIGS. 5 and 6.

With the diaphragm control device for a camera of the present invention, the cycle $t_i-t_{i-1}$ of each diaphragm pulse, such as shown in FIG. 2, can be experimentally measured and calculated in advance. FIG. 5 shows a table of measured pulse cycles. The values for this table are preprogrammed and stored in a ROM that may be used in the code of the CPU 100. The steps used in the software are the same as that shown in FIG. 3 and FIG. 4 (conventional example). Thus, when a diaphragm pulse is generated, the process jumps to the interruption procedure.

The instant invention differs from the conventional devices in the following manner. According to the present invention, the diaphragm stopping is determined by equation (3) from the pulse cycle $(t_n-t_{n-1})$, using the information that has been preprogrammed into the ROM. The pulse velocity of the present invention is not calculated from the difference between the previous pulse and the current pulse, as in conventional devices. This cycle is based upon the pulse generation number Cp, which comprises the cumulative number of pulses from the beginning of the diaphragm control. In the present invention, the steps of the control program are the same as that shown in FIG. 3 and the pulse interruption flow chart corresponds to that shown in FIG. 6.

In FIG. 6, when the interruption occurs, the pulse number Cp is read from the built-in counter in the CPU 100 in step S61. In step S62, the cycle $t_n-t_{n-1}$ is read from the table that has been preprogrammed into the ROM. In step S63, the predicted overrun pulse number An is calculated according to equation (2) using the data from step S62 in step S64. The determination as to whether the diaphragm should be stopped is figured by using equation (3). If equation (3) is satisfied, the diaphragm stopping magnet 38 is activated for a fixed time in step S65 and the diaphragm movement is stopped. The program then returns to step S4 of FIG. 3.

The delay time $t_d$, the time from the activation of the diaphragm stopping magnet 38 to the stopping of the diaphragm, may be stored in a replaceable memory such as an EEPROM or the like in the present invention.

In the above description of the invention, the cycles of the diaphragm pulses have been assumed to be comprised of fixed values taken from a table, but even these cycles may have differences because of variations between individual cameras. These variations may be assimilated by adjusting the delay time $t_d$, as the cycles extend systematically in an approximate proportional relationship according to the cycle table used. During the manufacture of the camera, as with a conventional device, the delay time $t_d$ may be adjusted so that the diaphragm is set to the diaphragm value needed to assimilate the variations of the diaphragm pulses.

According to the present invention, changes in the diaphragm pulse generation cycles for a camera can be pre-measured. A cycle table, as in FIG. 5, may also be prepared in advance. The predicted overrun pulse number is then calculated and the output time of a diaphragm stopping signal is determined. Therefore, even if the control system cannot accurately detect the diaphragm pulse generation time, diaphragm control can be accurately accomplished. Thus, it is possible to adjust individual variances in diaphragm pulse generation time with a single adjustment datum.

As described above, with the diaphragm control device for a camera according to the present invention, the control means determines the change in the generation cycle necessary to accurately stop the movement of the diaphragm. The control means makes the determination by referring to the recorded data and determines the time that is representative of the action of the diaphragm connection means. The stopping determination can be calculated with a high degree of accuracy and a highly accurate diaphragm control can be accomplished, even if the detection of the diaphragm pulse is delayed.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A diaphragm controlling device for accurately controlling the opening of a diaphragm of a camera, comprising:

a detecting component that detects a pulse signal generated corresponding to a change of a diaphragm opening diameter, a storing component that pre-stores a pulse generation cycle time associated with said pulse signal, an evaluating component that obtains an overrun amount of said diaphragm based on said pulse generation cycle time associated with said pulse signal, and calculates a period to instruct an engaging/stopping member of said diaphragm to carry out engaging/stopping action for every occurrence of said pulse signal, a controlling component that operates said diaphragm engaging/stopping member when the engaging/stopping action is instructed by said evaluating component.

2. The diaphragm controlling device as set forth in claim 1, wherein said storing component comprises a table that stores said pulse generation cycle for each pulse signal.

3. The diaphragm controlling device as set forth in claim 1, wherein said evaluating component calculates the predicted number of overrun pulses for said diaphragm based on a standard delay time, said pulse signal detected by said detecting component, and said pulse generation cycle corresponding to said pulse signal stored in the storing component.

4. The diaphragm controlling device as set forth in claim 3, wherein said evaluating component calculates based on the result of adding the predicted number of overrun pulses of said diaphragm to the total number of said pulse signals detected by said detecting component.

5. The diaphragm controlling device as set forth in claim 3, wherein said standard delay time is stored in an EEPROM, and is a value which is adjusted for each individual camera.

* * * * *